United States Patent [19]

Misura

[11] Patent Number: 5,770,115
[45] Date of Patent: Jun. 23, 1998

[54] PHOTOCHROMIC NAPHTHOPYRAN COMPOSITIONS OF IMPROVED FATIGUE RESISTANCE

[75] Inventor: Michael S. Misura, Clinton, Ohio

[73] Assignee: PPG Industries, Inc., Pittsburgh, Pa.

[21] Appl. No.: 639,855

[22] Filed: Apr. 19, 1996

[51] Int. Cl.$^6$ ................................................ G02B 5/23
[52] U.S. Cl. ................................................ 252/586
[58] Field of Search ................................. 252/582, 586

[56] References Cited

U.S. PATENT DOCUMENTS

| | | | |
|---|---|---|---|
| 3,906,041 | 9/1975 | Hofer et al. | 260/558 |
| 4,360,653 | 11/1982 | Stevens et al. | 526/301 |
| 4,818,096 | 4/1989 | Heller et al. | 351/163 |
| 4,826,977 | 5/1989 | Heller et al. | 544/70 |
| 4,931,221 | 6/1990 | Heller | 252/586 |
| 4,968,454 | 11/1990 | Crano et al. | 252/586 |
| 4,980,089 | 12/1990 | Heller | 252/586 |
| 4,994,208 | 2/1991 | McBain et al. | 252/586 |
| 5,066,818 | 11/1991 | Gemert et al. | 549/389 |
| 5,200,116 | 4/1993 | Heller | 252/586 |
| 5,200,483 | 4/1993 | Selvig | 526/301 |
| 5,238,981 | 8/1993 | Knowles | 524/110 |
| 5,244,602 | 9/1993 | Van Gemert | 252/589 |
| 5,266,447 | 11/1993 | Takahashi et al. | 252/586 |
| 5,274,132 | 12/1993 | VanGemert | 549/389 |
| 5,373,033 | 12/1994 | Toh et al. | 522/96 |
| 5,384,077 | 1/1995 | Knowles | 252/586 |
| 5,391,327 | 2/1995 | Ligas et al. | 252/586 |
| 5,395,567 | 3/1995 | Van Gemert et al. | 252/586 |
| 5,451,344 | 9/1995 | Knowles et al. | 252/586 |
| 5,458,814 | 10/1995 | Kumar et al. | 252/586 |
| 5,464,567 | 11/1995 | Knowles et al. | 252/586 |
| 5,466,398 | 11/1995 | Van Gemert et al. | 252/586 |
| 5,475,074 | 12/1995 | Matsuoka et al. | 526/336 |

FOREIGN PATENT DOCUMENTS

| | | |
|---|---|---|
| 43 25 154 | 9/1994 | Germany . |
| 3-282445 | 12/1991 | Japan . |
| 7-48363 | 2/1995 | Japan . |

*Primary Examiner*—Philip Tucker
*Attorney, Agent, or Firm*—Irwin M. Stein; Frank P. Mallak

[57] ABSTRACT

Describes a composition of a carrier, e.g., organic solvent or polymeric host material, photochromic naphthopyran material, and a stabilizer system comprising (a) polyphenolic antioxidant material, (b) ultraviolet light absorber and (c) hindered amine light stabilizer for said photochromic naphthopyran material. The stabilizer system is selected and used in amounts sufficient to provide at least a 30% reduction in % photopic fatigue of the naphthopyran material. The weight ratio of photochromic naphthopyran to the stabilizer system is from 2.5:1 to 1.5:1. The stabilizer system can comprise 5 to 50 weight percent of the antioxidant material, 5 to 50 weight percent of the ultraviolet light absorbent, and 10 to 90 weight percent of the hindered amine light stabilizer.

23 Claims, No Drawings

PHOTOCHROMIC NAPHTHOPYRAN COMPOSITIONS OF IMPROVED FATIGUE RESISTANCE

DESCRIPTION OF THE INVENTION

The present invention relates to photochromic naphthopyran compositions of improved fatigue resistance and to a method of improving the fatigue resistance of photochromic naphthopyran compounds. More particularly, this invention relates to organic photochromic naphthopyran compositions comprising (1) photochromic naphthopyran compounds and (2) a stabilizer system for such compounds comprising a combination of organic antioxidant material, ultraviolet light absorbing material and hindered amine light stabilizer material. The stabilizer system is used in amounts sufficient to improve the fatigue resistance of the photochromic naphthopyran compounds. Still more particularly, this invention relates to photochromic articles, e.g., ophthalmic lenses, containing photochromic naphthopyran compounds and said stabilizer system.

Photochromic compounds exhibit a reversible change in color when exposed to light radiation involving ultraviolet rays, such as the ultraviolet radiation in sunlight or the light of a mercury lamp. Various classes of photochromic compounds have been synthesized and suggested for use in applications in which a sunlight-induced reversible color change or darkening is desired. The most widely described classes are oxazines, naphthopyrans and fulgides.

The use of combinations of organic photochromic compounds with absorptions in the visible spectrum within selected ranges to produce articles and compositions having a near neutral gray or near neutral brown color when activated has been disclosed in U.S. Pat. No. 4,968,454. In this patent, an oxazine with a visible absorption greater than 590 nanometers is mixed with a second oxazine having at least one activated absorption maximum in the visible range between 400 and 590 nanometers. German patent No. 43 25 154 C1 describes a polymerizable mixture containing a number of photochromic colorants, at least one of which is not a spirooxazine. U.S. Pat. No. 5,066,818 discloses a mixture of diaryl-3H-naphtho(2,1-b)pyrans with naphthoxazines or benzoxazines to obtain a near neutral gray color A drawback to the widespread commercial use of organic photochromic compounds is the loss of their ability to exhibit a reversible change in color as a result of prolonged repeated exposure to ultraviolet (UV) light, i.e., the organic photochromic compounds lose their photochromism; namely, their ability to change color in response to UV light and subsequently revert to their original colorless state. This phenomenon is believed to be a result of irreversible decomposition of the organic photochromic compound and is referred to as fatigue or light fatigue.

U.S. Pat. No. 5,391,327 discloses the use of a combination of certain asymmetric diaryloxalamide (oxanilide) compounds and hindered amine light stabilizer (HALS) compounds in certain proportions and certain amounts to improve the fatigue resistance of a combination of oxazines and pyrans. Japanese patent publication 3-282445 describes generally incorporating UV stabilizers commonly used for plastics in photochromic moldings for enhanced durability. Examples of classes of UV stabilizers listed are singlet oxygen quenchers, hindered amine light stabilizers, hindered phenolic antioxidants and sulfur-containing antioxidants. Japanese patent publication 7-48363 describes generally improving the durability of a chromene-based photochromic material by shielding it from oxygen and water during use. In addition, the publication describes using singlet oxygen quenchers typified by nickel salts, nitroxy radical compounds, hindered amine compounds or polymers thereof and other antioxidants, ultraviolet light absorbers and triplet state quenchers to improve durability.

Although some advancements have been made toward increasing the fatigue resistance of photochromic materials, further improvements, even small incremental improvements, in the fatigue resistance of photochromic materials are still required. Hence, efforts to obtain such improvements have continued.

It has now been discovered that a stabilizer system of a combination of at least one polyphenolic antioxidant, at least one organic ultraviolet light absorber and at least one HALS compound improve the light fatigue resistance of photochromic naphthopyran compounds, particularly combinations of photochromic naphthopyrans that provide a neutral or substantially neutral color, e.g., gray or brown, and more preferably a combination of (i) at least one organic photochromic naphthopyran material having a visible lambda max of from 400 nanometers to 525 nanometers and (ii) at least one organic photochromic naphthopyran material having a visible lambda max of from greater than 525 nanometers to 650 nanometers.

DETAILED DESCRIPTION OF THE INVENTION

Polyphenolic antioxidants that may be used in the practice of the present invention may be represented by graphic formula I:

$$A-X_b \qquad \qquad I$$

wherein A is selected from the group consisting of: a group derived from saturated or unsaturated $C_1-C_4$ aliphatic hydrocarbons, such as $C_1-C_4$ alkyl and $C_1-C_4$ alkenyl; a group derived from saturated or unsaturated mono or di-cyclo($C_3-C_7$)hydrocarbons, such as mono or di-cyclo($C_3-C_7$)alkyl and mono or di-cyclo($C_3-C_7$)alkenyl; mono or di-cyclo($C_4-C_7$)alkynyl; mono or di-cyclo($C_5-C_7$)dienyl; isocyanurate; s-triazine-2,4,6-(1H,3H,5H)trione; and compounds represented by the following graphic formula II:

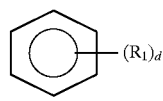

II wherein each $R_1$ is hydroxy or $C_1-C_4$ alkyl, and d is an integer from 0 to 3.

In graphic formula I, X is selected from the group consisting of the compounds represented by graphic formulae III, IIIA and IV:

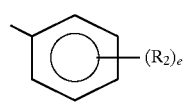

III

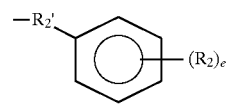

IIIA

-continued

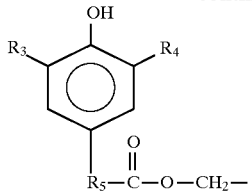

IV wherein each $R_2$ is hydroxy or $C_1$–$C_4$ alkyl, e is an integer from 0 to 5, preferably 3, $R_2$, is a $C_1$–$C_4$ alkylene, $R_3$ and $R_4$ are each $C_1$–$C_4$ alkyl, $R_5$ is a bivalent material derived from a $C_1$–$C_4$ aliphatic hydrocarbon, such as $C_1$–$C_4$ alkylene; and b is the integer 3 or 4. Compounds represented by graphic formula I include butylated reaction products of p-cresol and dicyclopentadiene, and 3:1 condensates of 3-methyl-6-t-butylphenol with crotonaldehyde.

Preferably, the polyphenolic antioxidant is selected from the group consisting of tetrakis[methylene(3,5-di-tert-butyl-4-hydroxyhydrocinnamate)]methane; 1,3,5-trimethyl-2,4,6-tris(3,5-di-tert-butyl-4'-hydroxybenzyl)benzene; 1,3,5-tris (3,5-di-tert-butyl-4'-hydroxybenzyl)isocyanurate; 3,5-di-tert-butyl-4-hydroxyhydrocinnamic triester with 1,3,5-tris (2-hydroxyethyl)s-triazine-2,4,6-(1H,3H,5H)-trione; 1,3,5-tris(4-tert-butyl-3-hydroxy-2,6-dimethylbenzyl)s-triazine-2,4,6-(1H,3H,5H)-trione; and mixtures of such polyphenolic antioxidants. More preferably, the polyphenolic antioxidant is selected from the group consisting of 1,3,5-tris(3,5-di-tert-butyl-4'-hydroxybenzyl)isocyanurate; 3,5-di-tert-butyl-4-hydroxyhydrocinnamic triester with 1,3,5-tris(2-hydroxyethyl)s-triazine-2,4,6-(1H,3H,5H)-trione; and mixtures thereof. Most preferably, the polyphenolic antioxidant is 1,3,5-tris(3,5-di-tert-butyl-4'-hydroxybenzyl) isocyanurate.

The organic ultraviolet light absorbers of the present invention include organic materials capable of absorbing UV-A ultraviolet radiation, i.e., wavelength in the range of from 320 to 400 nanometers, and more preferably, 350 to 400 nanometers. Specific groups of organic ultraviolet light absorbers of the present invention include: 2-hydroxybenzophenones, 2-hydroxyphenylbenzotriazoles, oxalanilides, 2-hydroxyphenyltriazines, cinnamates, salicylates, formamidines and mixtures thereof. A further description of oxalanilides to be included in the organic ultraviolet light absorbers of the present invention include the materials discussed in U.S. Pat. No. 5,391,327, column 2 line 37 to column 3 line 60 and U.S. Pat. No. 3,906,041, the disclosures of which are incorporated herein by reference.

The asymmetric diaryloxalamide compounds described in U.S. Pat. No. 3,906,041 may be represented by the following graphic formula.

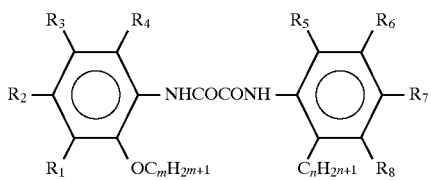

wherein m is an integer of from 1 to 8, n is an integer of from 1 to 4, and $R_1$ through $R_8$ are each selected from the group consisting of hydrogen, chloro, bromo, $C_1$–$C_{12}$ alkyl, $C_1$–$C_4$ alkenyl, $C_1$–$C_4$ alkoxy, $C_6$–$C_8$ aryl, $C_6$–$C_8$ aryloxy and phenyl ($C_1$–$C_4$) alkyl. Preferably $R_1$, $R_2$, $R_4$, $R_5$, $R_7$ and $R_8$ are methyl, ethyl, propyl, n-butyl, sec-butyl, t-butyl, more preferably $C_1$–$C_2$-alkyl, m is an integer of from 1 to 4 and n is an integer of from 0 to 2, e.g., 1 to 2.

Preferably, the organic ultraviolet light absorbers are selected from the group consisting of 2,4-bis(2,4-dimethylphenyl)-6-(2-hydroxy-4-iso-octylphenyl)-1,3,5-triazine; o-ethoxy-o'ethyl oxalic bis anilide; 2-(2H-benzotriazol-2-yl)-4,6-bis(1,1-dimethylpropyl)phenol; N-(2-ethoxyphenyl)-N'-(4-isododecylphenyl) ethanediamide; 2-cyano-3,3-diphenyl-2-propenoic acid, ethyl ester; and mixtures thereof. More preferably, the ultraviolet light stabilizer is selected from the group consisting of 2,4-bis(2,4-dimethylphenyl)-6-(2-hydroxy-4-iso-octylphenyl)-1,3,5-triazine; N-(2-ethoxy phenyl)-N'-(4-isododecylphenyl)ethanediamide; and mixtures thereof. Most preferably, the organic ultraviolet light stabilizer is 2,4-bis(2,4-dimethylphenyl)-6-(2-hydroxy-4-iso-octylphenyl)-1,3,5-triazine.

The hindered amine light stabilizer (HALS) that may be used in the present invention include those HALS materials reported to function as radical scavengers and that contain a 2,2,6,6-tetramethylpiperperidine ring or 2,2,6,6-tetramethylpiperperazinone. Preferably, the HALS material is selected from the group consisting of bis(1,2,2,6,6-pentamethyl-4-piperdinyl)[3,5-bis(1,1-dimethylethyl-4-hydroxyphenyl)methyl]butyl propanedioate; bis(2,2,6,6-tetramethyl-4-piperdinyl)decanedioate; 1-acetyl-4-(3-dodecyl-2,5-dioxo-1-pyrrolidinyl)-2,2,6,6-tetramethyl-piperidine; N-unsubstituted HALS compounds, e.g., SANDUVOR 3051, 3052 AND 3055; N-methylated HALS compounds, e.g., SANDUWOR 3056; and mixtures thereof. More preferably, the HALS material is selected from the group consisting of bis(2,2,6,6-tetramethyl-4-piperdinyl) decanedioate; 1-acetyl-4-(3-dodecyl-2,5-dioxo-1-pyrrolidinyl)-2,2,6,6-tetramethyl-piperidine; N-unsubstituted HALS compounds and mixtures thereof.

In accordance with the present invention, the resistance to light fatigue of organic photochromic naphthopyran material is improved by combining with the naphthopyran an effective amount of the stabilizer system in a carrier. More particularly, the stabilizer system described herein; namely, the combination of at least one of each of the following: polyphenolic antioxidant, organic ultraviolet light absorber and hindered amine light stabilizer, is used in an amount that provides a reduction of 30 percent or more of the % Photopic Fatigue for the photochromic naphthopyran compounds described herein (compared to the % Photopic Fatigue without stabilizers). For example, if the % Photopic Fatigue for a photochromic naphthopyran material in a carrier, e.g., lens, is 40%, the amount of the stabilizer system used in combination with the photochromic naphthopyrans will be an amount sufficient to provide a % Photopic Fatigue of 28% or less.

When the carrier is a polymeric host intended for use as an optical article, e.g., ophthalmic lens, other criteria (in addition to a reduction in % Photopic Fatigue) may be used to judge the effectiveness of the stabilizer system as it relates to the acceptability of the finished product. Such other criteria include the following: initial b* (I b*), final b* (F b*) and Δb*, which relate to the development of a yellow color, as measured in the CIELAB system; % Fatigue at 470 nanometers (nm), 570 nm and the product of [% Fatigue @ 570 nm÷Fatigue @ 470 nm], which relates to the % Fatigue at specific wavelengths corresponding to the wavelength of the activated colors of the photochromic naphthopyrans and the difference between those values determined as the product value greater or less than 1.0.

The weight ratio of photochromic naphthopyran material to the stabilizer system combination of polyphenolic antioxidant, organic ultraviolet light absorber and hindered amine light stabilizer ranges from 2.5:1 to 1.5:1, and preferably ranges from 2:1 to 1.6:1. The weight percent of the individual components of the stabilizer system, based on the total weight of the stabilizer system, may range from 5 to 50% polyphenolic antioxidant (AO), 5 to 50% ultraviolet light absorber (ULA) and 10 to 90% HALS; preferably, 10 to 40% AO, 10 to 40% ULA and 20 to 80% HALS; and more preferably, 10 to 30% AO, 10 to 30% ULA and 20 to 70% HALS. The amounts of the three components comprising the stabilizer system add up to 100 percent.

The amount of each component comprising the stabilizer system and the selection of the particular polyphenolic antioxidant, ultraviolet absorber and hindered amine light stabilizer will vary and depend on the particular photochromic naphthopyran compound(s) to be stabilized and, when several naphthopyran compounds are used in combination, the relative amounts of each naphthopyran compound used in the combination. One skilled in the art to which the invention is directed may select the amount of each component comprising the stabilizer system by combining the stabilizer system chosen with the selected photochromic naphthopyran compounds and fatiguing the naphthopyran compounds, as described in the Example. Preferably, the stabilizer system will result in a reduction of 30 percent or more of the % Photopic Fatigue, and a value of near 1.0 for the product of % Fatigue @ 570 nm÷% Fatigue @ 470 nm, as described in the Example. In addition, when imbibition of the naphthopyran compounds into a polymeric host material is used, the selection of the stabilizer system may be influenced by the condition of the surface of the polymeric host after imbibition. Defects in the surface such as orange peel, i.e., the surface of the lens had the appearance of the exterior of an orange or basketball with numerous dimples; crystals, i.e., the presence of crystalline material; yellow coloration, i.e., a perceptible yellow color; indentations, i.e., small pits or indentations in the lens surface; beads, i.e., liquid remaining on the surface that formed small bead-like droplets; puddles, i.e., liquid remaining on the surface that formed flat droplets or puddles of material; and picture framing, i.e., an accumulation of the imbibition formulation at the border of the lens.

The photochromic naphthopyran composition of the present invention comprises in combination, a carrier, the stabilizer system and at least one photochromic naphthopyran. The photochromic naphthopyran compounds that may be used in the present invention are selected from the group consisting of 3[H]-naphtho[2,1-b]pyrans and 2[H]-naphtho[1,2-b]pyrans. Such naphthopyrans may be represented by the following graphic formulae V and VI, respectively:

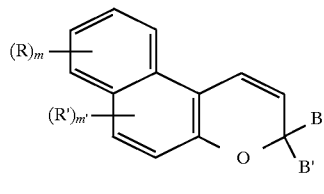

V

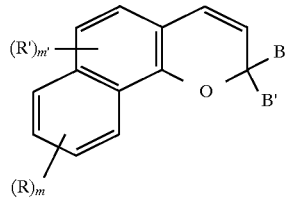

VI

The substituents represented by $(R)_m$, $(R')_{m'}$, B, and B' and additional modifications to graphic formulae V and VI are described in the following patents and patent applications, the disclosures of which respecting those compound formulae are incorporated by reference herein:

U.S. Pat. Nos. 4,818,096; 4,826,977; 4,931,221; 4,980,089; 5,066,818; 5,200,116; 5,238,981; 5,244,602; 5,274,132; 5,384,077; 5,395,567; 5,451,344; 5,458,814; 5,464,567; 5,466,398; 5,645,767; 5,650,098; 5,552,090; 5,585,042; 5,514,817; and U.S. application Ser. Nos. 08/490,189, filed Jun. 14, 1995; 08/490,188, filed Jun. 14, 1995; 08/490,258, filed Jun. 14, 1995; 08/490,190, filed Jun. 14, 1995.

In particular, combinations of photochromic naphthopyran materials that will exhibit an activated neutral or near neutral color of gray or brown, when incorporated into an organic polymeric host carrier and exposed to solar ultraviolet radiation are contemplated in the present invention. More particularly, the combinations of photochromic organic naphthopyran compounds comprise:
(a) at least one photochromic organic naphthopyran compound having a visible lambda max of from 400 nanometers to 525 nanometers; and
(b) at least one photochromic organic naphthopyran compound having a visible lambda max of from greater than 525 nanometers to 650 nanometers.

Photochromic naphthopyrans of the aforedescribed group (a) include those selected from the group consisting of:
(1) 2,2-diphenyl-5-hydroxymethyl-6-methyl-9-methoxy-2H-naphtho [1,2-b] pyran;
(2) 2,2-diphenyl-5-hydroxymethyl-6-phenyl-2H-naphtho[1,2-b]pyran;
(3) 2,2-diphenyl-5-(2-ethoxy-2-oxo-ethoxycarbonyl)-8-methyl-2H-naphtho[1,2-b]pyran;
(4) 2,2-diphenyl-5-methoxycarbonyl-8-methyl-2H-naphtho[1,2-b]pyran;
(5) 3-(2-fluorophenyl)-3-(4-methoxyphenyl)-8-methoxy-9-methoxycarbonyl-3H-naphtho[2,1-b]pyran;
(6) 3,3-di-(4-methoxyphenyl)-6-morpholino-3H-naphtho[2,1-b]pyran;
(7) 3-(2-methyl-2,3-dihydrobenzofuran-5-yl)-3-(4-methoxyphenyl)-6-morpholino-3H-naphtho[2,1-b]pyran;
(8) 3,3-diphenyl-8-methoxy-3H-naphtho[2,1-b]pyran;
(9) 2,2-diphenyl-4-methoxycarbonyl-5-(2-methylpropionyloxy)-2H-naphtho[1,2-b]pyran; and
(10) mixtures of said naphthopyrans.

Photochromic naphthopyrans of the aforedescribed group (b) include those selected from the group consisting of:
(1) 3-(4-methoxyphenyl)-3-(3-methyl-4-methoxyphenyl)-13-hydroxy-indeno[2,1-f]naphtho[1,2-b]pyran;
(2) 3,3-di(4-methoxyphenyl)-13-hydroxy-13-methylindeno[2,1-f]naphtho[1,2-b]pyran;
(3) 3,3-di(4-methoxyphenyl)-6,11-dimethyl-13-(1-methylethyl)-13-hydroxy-indeno[2,1-f]naphtho[1,2-b]pyran;
(4) 3-(4-methoxyphenyl)-3-(3,4-dimethoxyphenyl)-6,11-dimethyl-13,13-dipropyl-indeno[2,1-f]naphtho[1,2-b]pyran; and
(5) mixtures of said naphthopyrans.

More particularly, the photochromic naphthopyran compound of group (a) is selected from the group consisting of:
(1) 2,2-diphenyl-5-(2-ethoxy-2-oxo-ethoxycarbonyl)-8-methyl-2H-naphtho[1,2-b]pyran;
(2) 2,2-diphenyl-5-methoxycarbonyl-8-methyl-2H-naphtho[1,2-b]pyran; and
(3) mixtures of said naphthopyrans.

More particularly, the photochromic naphthopyran compound of group (b) is 3,3-di(4-methoxyphenyl)-6,11-dimethyl-13-(1-methylethyl)-13-hydroxy-indeno[2,1-f]naphtho[1,2-b]pyran.

Other than in the operating examples, or when otherwise indicated, all values, such as those expressing wavelengths, quantities of ingredients, ranges or reaction conditions, used in this description and the accompanying claims are to be understood as modified in all instances by the term "about".

The amount of the photochromic naphthopyrans to be applied to or incorporated into an organic polymeric host is not critical provided that a sufficient amount is used to produce a photochromic effect discernible to the naked eye upon activation. Generally such amount can be described as a photochromic amount. The particular amount used depends often upon the intensity of color desired upon irradiation thereof and upon the method used to incorporate or apply the photochromic compounds. Typically, the more photochromic compound applied or incorporated, the greater is the color intensity up to a certain limit.

Preferably, the photochromic organic naphthopyrans described herein are used in amounts (and in a ratio) such that an organic carrier, e.g., solid polymeric host, to which the photochromic compounds or mixture of compounds is applied or in which they are incorporated exhibits a desired resultant color, e.g., a substantially neutral color when activated with unfiltered sunlight, i.e., as near a neutral color as possible given the colors of the activated photochromic compounds.

A neutral gray color exhibits a spectrum that has relatively equal absorption in the visible range between 400 and 700 nanometers. A neutral brown color exhibits a spectrum in which the absorption in the 400–550 nanometer range is moderately larger than in the 550–700 nanometer range. An alternative way of describing color is in terms of its chromaticity coordinates, which describe the qualities of a color in addition to its luminance factor, i.e., its chromaticity. In the CIE system, the chromaticity coordinates are obtained by taking the ratios of the tristimulus values to their sum, e.g., $x=X/(X+Y+Z)$ and $y=Y/(X+Y+Z)$. Color as described in the CIE system can be plotted on a chromaticity diagram, usually a plot of the chromaticity coordinates x and y. See pages 47–52 of *Principles of Color Technology*, by F. W. Billmeyer, Jr., and Max Saltzman, Second Edition, John Wiley and Sons, N.Y. (1981). Previous definitions of near neutral color in, for example, U.S. Pat. No. 4,968,454, column 3, lines 24 to 30, have specified ranges for the chromaticity coordinates x (from 0.260 to 0.400) and y (from 0.280 to 0.400). These ranges correspond to a* and b* ranges in the CIELAB color system for a* from −43.6 to 54.0 and for b* from −22.5 to 33.1. Preferably, a near neutral color is one in which the chromaticity coordinate values of "x" and "y" for the color are within the following ranges for a $D_{65}$ illuminant and a 10 degree observer: x=0.274 to 0.355, y=0.300 to 0.365 following activation to 40 percent luminous transmission by exposure to solar radiation (Air Mass 1 or 2). Expressed in terms of CIELAB color space, a neutral color is one in which the chromaticity coordinate values of "a*" and "b*", under the same conditions as previously stated, range for a* from −10 to +10 and for b* from −10 to +10.

The relative amounts of the photochromic naphthopyran compounds used will vary and depend in part upon the relative intensities of the color of the activated species of such compounds, and the ultimate color desired. Generally, the amount of total photochromic compound used in combination with the selected carrier may range from about 0.05 to about 1.0, e.g., from 0.1 to about 0.45, milligrams per square centimeter of volume or surface to which the photochromic compound(s) is/are incorporated or applied.

In the method of the present invention, an effective amount of the stabilizer system is added to the carrier before, after or in conjunction with the photochromic naphthopyrans. The individual materials of the stabilizer system may be added separately or together to the carrier. The components of the stabilizer system and the photochromic naphthopyrans may be applied to or incorporated into the carrier by various methods described in the art. Such methods include dissolving or dispersing the stabilizer components and/or naphthopyran compounds (additives) within an organic solvent or organic polymeric host material, e.g., casting in place by adding the additives to the monomeric host material prior to polymerization; imbibition of the additives into the host material by immersion of the host material in a hot solution of the additives or by thermal transfer; providing the additives as a separate layer between adjacent layers of the host material, e.g., as a part of a polymeric film; applying the additives as part of a coating placed on the surface of the host material; and using combinations of such methods for applying individual materials of the stabilizer system. The term "imbibition" or "imbibe" is intended to mean and include permeation of the additives alone into the host material, solvent assisted transfer of the additives into a porous polymer, vapor phase transfer, and other such transfer mechanisms.

Compatible (chemically and color-wise) tints, i.e., dyes, may be applied to the carrier to achieve a more aesthetic result, for medical reasons, or for reasons of fashion. The particular dye selected will vary and depend on the aforesaid need and result to be achieved. In one embodiment, the dye may be selected to complement the color resulting from the activated photochromic compounds, e.g., to achieve a more neutral color or absorb a particular wavelength of incident light. In another embodiment, the dye may be selected to provide a desired hue to the host matrix when the photochromic compounds are in an unactivated state.

The polymeric host carrier will usually be transparent, but may be translucent or even opaque. The carrier need only be pervious to that portion of the electromagnetic spectrum, which activates the photochromic substance, i.e., that wavelength of ultraviolet (UV) light that produces the open or colored form of the substance and that portion of the visible spectrum that includes the absorption maximum wavelength of the substance in its UV activated form, i.e., the open form. Preferably, the carrier color should not be such that it masks the color of the activated form of the photochromic compounds, i.e., so the change in color is readily apparent to the observer.

The carrier of the present invention may be an organic solvent or an organic polymeric host. The organic solvent may be selected from the group consisting of benzene, toluene, methyl ethyl ketone, acetone, ethanol, tetrahydrofurfuryl alcohol, N-methyl pyrrolidinone, 2-methoxyethyl ether, xylene, cyclohexane, 3-methyl cyclohexanone, ethyl acetate, tetrahydrofuran, methanol, methyl propionate, ethylene glycol and mixtures thereof. Preferably, the organic solvent is selected from the group consisting of acetone, ethanol, tetrahydrofurfuryl alcohol, 2-methoxyethyl ether, 3-methyl cyclohexanone, N-methyl pyrrolidinone and mixtures thereof.

Preferably, the carrier is an organic polymeric host material that is a solid transparent or optically clear material, e.g., materials suitable for optical applications, such as plano and ophthalmic lenses, windows, automotive transparencies, e.g., windshields, aircraft transparencies, plastic sheeting, polymeric films, etc.

Examples of polymeric organic host materials are polymers prepared from individual monomers or mixtures of monomers selected from the following groups:

(a) diacrylate or dimethacrylate compounds represented by graphic formula VII:

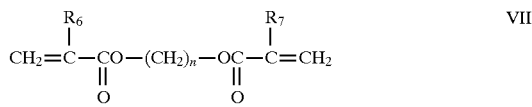

wherein $R_6$ and $R_7$ may be the same or different and are hydrogen or methyl, and n is an integer of from 1 to 20, preferably 1 to 10;

(b) diacrylate or dimethacrylate compounds represented by graphic formula VIII:

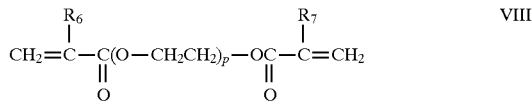

wherein p is an integer of from 1 to 50, preferably 1–10; and (c) an acrylate or a methacrylate compound having an epoxy group represented by graphic formula IX:

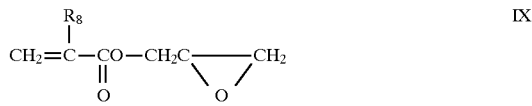

wherein $R_8$ is hydrogen or methyl.

In graphic formulae VII, VIII and IX, like letters used with respect to the definitions of different substituents have the same meaning.

Examples of diacrylate or dimethacrylate compounds represented by graphic formulae VII and VIII include diethylene glycol dimethacrylate, triethylene glycol dimethacrylate, etc., butanediol dimethacrylate and poly(oxyalkylene dimethacrylates), e.g., polyethylene glycol (600) dimethacrylate. Examples of acrylate or methacrylate compounds represented by graphic formula IX include glycidyl acrylate and glycidyl methacrylate.

Further examples of polymeric organic host materials which may be used as carriers in the present invention described herein include: polymers, i.e., homopolymers and copolymers, of the monomers and mixtures of monomers represented by graphic formulae VII, VIII and IX, bis(allyl carbonate) monomers, diisopropenyl benzene monomers, ethoxylated bisphenol A dimethacrylate monomers, ethylene glycol bismethacrylate monomers, poly(ethylene glycol) bis methacrylate monomers, ethoxylated phenol bis methacrylate monomers, alkoxylated polyhydric alcohol polyacrylate monomers, such as ethoxylated trimethylol propane triacrylate monomers, urethane acrylate monomers, such as those described in U.S. Pat. No. 5,373,033, and vinylbenze monomers, such as those described in U.S. Pat. No. 5,475,074 and styrene; polymers, i.e., homopolymers and copolymers, of polyfunctional, e.g., mono-, di- or multi-functional, acrylate and/or methacrylate monomers, poly[($C_1$–$C_{12}$) alkyl methacrylates], such as poly(methyl methacrylate), poly(alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), polyurethanes, thermoplastic polycarbonates, polyesters, poly(ethylene terephthalate), polystyrene, poly(alpha methylstyrene), copoly(styrene-methyl methacrylate), copoly(styrene-acrylonitrile), polyvinylbutyral and polymers, i.e., homopolymers and copolymers, of diallylidene pentaerythritol, particularly copolymers with polyol (allyl carbonate) monomers, e.g., diethylene glycol bis(allyl carbonate), and acrylate monomers, e.g., ethyl acrylate, butyl acrylate.

Transparent copolymers and blends of transparent polymers are also suitable as polymeric carrier host materials. Preferably, the host material is an optically clear polymerized organic material prepared from a thermoplastic polycarbonate resin, such as the carbonate-linked resin derived from bisphenol A and phosgene, which is sold under the trademark, LEXAN; a polyester, such as the material sold under the trademark, MYLAR; a poly(methyl methacrylate), such as the material sold under the trademark, PLEXIGLAS; polymerizates of a polyol(allyl carbonate) monomer, especially diethylene glycol bis(allyl carbonate), which monomer is sold under the trademark CR-39, and polymerizates of copolymers of a polyol (allyl carbonate), e.g., diethylene glycol bis(allyl carbonate), with other copolymerizable monomeric materials, such as copolymers with vinyl acetate, e.g., copolymers of from 80–90 percent diethylene glycol bis(allyl carbonate) and 10–20 percent vinyl acetate, particularly 80–85 percent of the bis(allyl carbonate) and 15–20 percent vinyl acetate, and copolymers with a polyurethane having terminal diacrylate functionality, as described in U.S. Pat. Nos. 4,360,653 and 4,994,208; and copolymers with aliphatic urethanes, the terminal portion of which contain allyl or acrylyl functional groups, as described in U.S. Pat. No. 5,200,483; poly(vinyl acetate), polyvinylbutyral, polyurethane, polymers of members of the group consisting of diethylene glycol dimethacrylate monomers, diisopropenyl benzene monomers, ethoxylated bisphenol A dimethacrylate monomers, ethylene glycol bismethacrylate monomers, poly(ethylene glycol) bismethacrylate monomers, ethoxylated phenol bis methacrylate monomers and ethoxylated trimethylol propane triacrylate monomers; cellulose acetate, cellulose propionate, cellulose butyrate, cellulose acetate butyrate, polystyrene and copolymers of styrene with methyl methacrylate, vinyl acetate and acrylonitrile.

More particularly, contemplated is use of optical organic resin monomers used to produce optically clear polymerizates, i.e., materials suitable for optical applications, such as for example plano and ophthalmic lenses, windows, and automotive transparencies. Such optically clear polymerizates may have a refractive index that may range from about 1.48 to about 1.75, e.g., from about 1.495 to about 1.66. Specifically contemplated are optical resins sold by PPG Industries, Inc. under the designations CR-390® monomer, CR-307 and CR-407.

The present invention is more particularly described in the following example which is intended as illustrative only, since numerous modifications and variations therein will be apparent to those skilled in the art. In the example, the designation P-C refers to Photochromic Compound; AO-C refers to Antioxidant Compound; HALS-C refers to Hindered Amine Light Stabilizing Compound; and ULA-C refers to Ultraviolet Light Absorbing Compound; P-C 1 is a naphthopyran that has a visible lambda max within the range of from 400 nanometers to 525 nanometers. P-C 1 is 2,2-diphenyl-5-(2-ethoxy-2-oxoethoxycarbonyl)-8-methyl-2H-naphtho[1,2-b]. Compound P-C 1 may be prepared by the methods described in U.S. patent application Ser. No. 08/490,190 filed Jun. 14, 1995.

P-C 3 is a naphthopyran having a visible lambda max within the range of from greater than 525 nanometers to 650 nanometers. P-C 3 is 3,3-di(4-methoxyphenyl)-6,11-dimethyl-13-(1-methylethyl)-13-hydroxy-indeno[2,1-f]naphtho[1,2-b]pyran, and may be prepared by the method described in U.S. Pat. No. 5,645,767.

Polyphenolic antioxidant Compound (AO-C) 1 is 1,3,5-tris(3,5-di-tert-butyl-4'-hydroxybenzyl)isocyanurate and is sold as IRGANOX 3114 by Ciba-Geigy Corporation.

Hindered Amine Light Stabilizing Compound (HALS-C) 1 is reported to be an N-unsubstituted HALS compound sold as SANDUVOR 3051 by Sandoz Chemicals Corporation. HALS-C 2 is reported to be an N-unsubstituted HALS compound of graphic formula X sold as SANDUVOR 3052 by Sandoz Chemicals Corporation.

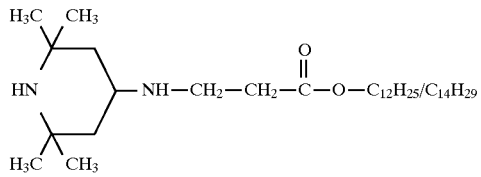

HALS-C 3 is reported to be an N-unsubstituted HALS compound of graphic formula XI sold as SANDUVOR 3055 by Sandoz Chemicals Corporation.

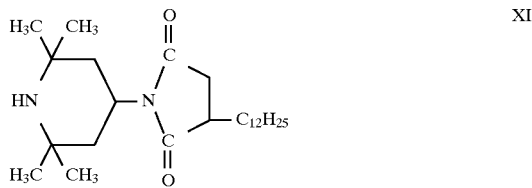

HALS-C 4 is reported to be an N-methylated HALS compound of graphic formula XII sold as SANDUVOR 3056 by Sandoz Chemicals Corporation.

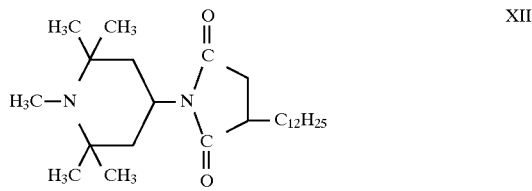

HALS-C 5 is reported to be 1-acetyl-4-(3-dodecyl-2,5-dioxo-1-pyrrolidinyl)-2,2,6,6-tetramethyl-piperidine and is sold as SANDUVOR 3058 by Sandoz Chemicals Corporation. HALS-C 6 is reported to be bis(2,2,6,6-tetramethyl-4-piperdinyl)decanedioate and is sold as TINUVIN 770 by Ciba-Geigy Corporation.

Ultraviolet Light Absorbing (ULA) Compound 1 is 2,4-bis(2,4-dimethylphenyl)-6-(2-hydroxy-4-iso-octylphenyl)-1,3,5-triazine and is sold as CYAGARD UV-1164L by American Cyanamid Co. ULA-C 2 is o-ethoxy-o'ethyl oxalic bis anilide and is sold as SANDUVOR VSU by Sandoz Chemicals Corporation. ULA-C 3 is 2-cyano-3,3-diphenyl-2-propenoic acid, ethyl ester and is sold as UVINUL 3035 by BASF Corporation. ULA-C 4 is 2-(2H-benzotriazol-2-yl)-4,6-bis(1,1-dimethylpropyl)phenol and is sold as TINUVIN 328 by Ciba-Geigy Corporation.

EXAMPLE 1

PART A

Testing was done with the previously described photochromic compounds (P-C), polyphenolic antioxidants (AO-C), HALS (HALS-C) and UV light stabilizers (ULA-C). The components of the stabilizer system are referred to collectively herein as the Example Additives. The carrier was an optical lens. Test sample lenses were 76 mm in diameter and were cast from an optical resin sold by PPG Industries, Inc. under the designation CR-407. The tested photochromic and Example Additive compounds were imbibed into the sample lenses using a formulation containing from 5 to 10 weight percent of the photochromic compounds, an amount of Additive(s) equal to approximately 0.56 times the weight percent of the photochromics, an amount of hydroxypropylcellulose resin sufficient to form a film containing the P-C and Additives on the lens and sufficient organic solvent to yield 100 weight percent. The organic solvent used was a mixture of n-methyl pyrrolidone, 2-methoxy ethyl ether, and tetrahydrofurfuryl alcohol, in a weight ratio of 20:50:30. Listed in Tables 1 through 6 are the specific weight ratios of the Additive components or photochromic compounds used. A film of the imbibition formulation was placed onto the surface of the test lenses by spin coating and allowed to dry. The lenses were then heated in a hot-air oven at 135°–155° C. for a period of time sufficient to thermally transfer photochromic compounds and Additives into the lenses. After cooling, the resin film was removed from the test samples by washing with water and acetone. The average dry weight of the resin film before imbibition ranged from 70 to 90 milligrams. The residence time in the oven for the test samples was adjusted to imbibe comparable amounts of the photochromic compounds.

Part B

The photochromic test lenses prepared in Part A were tested for photochromic response on an optical bench. Prior to testing on the optical bench, the photochromic test lenses were exposed to 365 nanometer ultraviolet light for about 15 minutes to activate the photochromic compounds and then placed into a 76° C. oven for about 15 minutes to bleach or inactivate the photochromic compounds. The lens samples were then cooled to room temperature, exposed to fluorescent room lighting for at least 2 hours and then kept covered for at least 2 hours prior to testing on an optical bench maintained at 100° F. (37.8° C.).

The optical bench was fitted with a 300 watt Xenon arc lamp, a remote controlled shutter, a Schott WG-320 nm cut-off filter which removes short wavelength radiation; neutral density filter(s) and a sample holder in which the lens to be tested was inserted. A collimated beam of light from a tungsten lamp was passed through the lens at a small angle (approximately 15°) normal to the surface of the lens. After passing through the lens area activated by the Xenon arc lamp, the light from the tungsten lamp was directed by beam splitting through two narrow band pass filters of 470 nm and 570 nm and a photopic filter to detectors. The output signals from the detectors were processed by radiometers. Changes in the Xenon bulb wattage and neutral density filters were made to insure that a consistent amount of light energy was being measured by the radiometer in each test.

The b* color values of the CIELAB color space were collected under the conditions of a $D_{65}$ illuminant and a 10 degree observer on a SPECTROGARD II color spectrophotometer. The control of the test conditions and acquisition of data was handled by the Labtech Notebook Pro software and the recommended I/O board.

After photochromic response measurements were taken, the test lens was fatigued by exposure to solar simulated radiation. A Heraeus Suntest CPS was used for conducting simulated solar radiation accelerated weathering. The sample results reported in Tables 1–6 were obtained after 100 hours exposure to Xenon bulb output in the Heraeus Suntest CPS. After the lenses underwent the fatiguing process, they were prepared and measured on the optical bench under the same conditions prior to exposure.

Percent Fatigue (% Fat) was determined by measuring the difference between the change in optical density (ΔOD) of the test sample before and after accelerated weathering and calculating the percent reduction in optical density that the difference represents. Change in optical density (ΔOD) was determined by inserting a test lens in the bleached state into the sample holder, measuring the transmittance ($T_B$), opening the shutter from the Xenon lamp to provide solar simulated radiation to change the test sample from the bleached state to an activated (i.e., darkened) state, measuring the transmittance in the activated state ($T_A$), and calculating the change in optical density according to the formula:

$$\Delta OD = \log(T_B/T_A) \text{ (logarithm is to the base 10)}.$$

The Percent Fatigue was measured for specific wavelengths using band pass filters that correspond to the wavelengths within about ±15 nanometers of the visible lambda max of the photochromic compound being measured, i.e., 470 nm and 570 nm, and the wavelength passed by the Photopic filter which closely corresponds to visible light responses detected by the human eye. Also reported in Tables 1 through 6 is the product of [% Fat @ 570 nm ÷ % Fat @ 470 nm]. A number closest to 1.0 is most desirable since it indicates that the photochromic compounds are fatiguing at the same rate and would produce consistent activated colors during the lifetime of the lens.

TABLE 1*

| Test Run No. | Additive | Weight Ratio | I b* | F b* | % Fatigue Photopic | [% Fat @ 570 nm ÷ % Fat @ 470 nm] |
|---|---|---|---|---|---|---|
| 1 | Control | — | 3.6 | 8.8 | 43 | 1.52 |
| 2 | AO-C 1 | — | 3.0 | 6.8 | 29 | 1.22 |
| 3 | ULA-C 1 | — | 3.8 | 7.8 | 44 | 1.55 |
| 4 | HALS-C 5 | — | 2.9 | 6.9 | 33 | 1.55 |
| 5 | HALS-C 4 | — | 2.6 | 5.9 | 21 | 1.22 |
| 6 | HALS-C 6 | — | 2.6 | 6.2 | 20 | 0.87 |
| 7 | HALS-C 1 | — | 3.1 | 6.3 | 20 | 0.91 |
| 8 | ULA-C 1/AO-C 1/HALS-C 5 | 50/30/20 | 3.2 | 6.1 | 27 | 1.33 |
| 9 | ULA-C 1/AO-C 1/HALS-C 4 | 50/30/20 | 2.8 | 5.2 | 22 | 1.15 |
| 10 | ULA-C 1/AO-C 1/HALS-C 6 | 50/30/20 | 2.3 | 5.5 | 21 | 0.57 |
| 11 | ULA-C 1/AO-C 1/HALS-C 1 | 50/30/20 | 2.8 | 5.6 | 23 | 0.96 |

*Data obtained using a 60/40 weight ratio of P-C 3/P-C 1. Fatigue measured after 100 hours under Xenon bulb.

TABLE 2*

| Test Run No. | Additive | Weight Ratio | I b* | F b* | % Fatigue Photopic | [% Fat @ 570 nm ÷ % Fat @ 470 nm] |
|---|---|---|---|---|---|---|
| 1 | Control | — | 2.8 | 7.1 | 46 | 1.88 |
| 2 | AO-C 1 | — | 2.5 | 5.9 | 31 | 1.15 |
| 3 | ULA-C 1 | — | 2.6 | 6.2 | 44 | 1.64 |
| 4 | HALS-C 5 | — | 2.8 | 6.1 | 33 | 1.5 |
| 5 | HALS-C 4 | — | 2.4 | 5.3 | 22 | 0.66 |
| 6 | HALS-C 6 | — | 2.6 | 6.6 | 24 | 0.56 |
| 7 | HALS-C 1 | — | 2.4 | 5.9 | 21 | 0.61 |
| 8 | ULA-C 1/AO-C 1/HALS-C 5 | 50/30/20 | 2.5 | 5.6 | 29 | 1.12 |
| 9 | ULA-C 1/AO-C 1/HALS-C 4 | 50/30/20 | 2.3 | 4.4 | 20 | 0.63 |
| 10 | ULA-C 1/AO-C 1/HALS-C 6 | 50/30/20 | 2.2 | 4.9 | 22 | 0.69 |
| 11 | ULA-C 1/AO-C 1/HALS-C 1 | 50/30/20 | 2.5 | 4.9 | 21 | 0.83 |

*Data obtained using a 35/65 weight ratio of P-C 3/P-C 1. Fatigue measured after 100 hours under Xenon bulb.

TABLE 3*

| Test Run No. | Additive | Ratio | I b* | F b* | % Fatigue Photopic | [% Fat @ 570 nm ÷ % Fat @ 470 nm] |
|---|---|---|---|---|---|---|
| 1 | Control | — | 2.6 | 7.6 | 52 | 2.04 |
| 2 | HALS-C 2/HALS-C 5/AO-C 1 | 50/25/25 | 2.1 | 6.5 | 29 | 0.88 |
| 3 | HALS-C 2/AO-C 1/ULA-C 1 | 65/25/10 | 1.7 | 5.3 | 27 | 0.76 |
| 4 | HALS-C 2/AO-C 1/ULA-C 4 | 65/25/10 | 1.8 | 6.5 | 28 | 0.85 |
| 5 | HALS-C 3/AO-C 1/ULA-C 2 | 55/25/20 | 2.3 | 6.1 | 31 | 1.22 |
| 6 | HALS-C 2/AO-C 1/ULA-C 3 | 55/25/20 | 1.9 | 5.9 | 30 | 1.0 |

*Data obtained using a 61/39 weight ratio of P-C 3/P-C 1. Fatigue measured after 100 hours under Xenon bulb.

TABLE 4*

| Test Run No. | Additive | Ratio | I b* | F b* | % Fatigue Photopic | [% Fat @ 570 nm ÷ % Fat @ 470 nm] |
|---|---|---|---|---|---|---|
| 1 | Control | — | 2.3 | 6.5 | 61 | 2.09 |
| 2 | HALS-C 2/HALS-C 5/AO-C 1 | 50/25/25 | 1.7 | 5.3 | 44 | 1.38 |
| 3 | HALS-C 2/AO-C 1/ULA-C 1 | 65/25/10 | 1.5 | 5.9 | 35 | 0.76 |
| 4 | HALS-C 2/AO-C 1/ULA-C 4 | 65/25/10 | 2.0 | 6.0 | 34 | 1.28 |
| 5 | HALS-C 3/AO-C 1/ULA-C 2 | 55/25/20 | 1.9 | 5.6 | 31 | 0.86 |
| 6 | HALS-C 2/AO-C 1/ULA-C 3 | 55/25/20 | 1.6 | 6.6 | 35 | 0.88 |

*Data obtained using a 35/65 weight ratio of P-C 3/P-C 1. Fatigue measured after 100 hours under Xenon bulb.

TABLE 5*

| Test Run No. | Additive | Weight Ratio | I b* | F b* | % Fatigue Photopic | [% Fat @ 570 nm ÷ % Fat @ 470 nm] |
|---|---|---|---|---|---|---|
| 1 | HALS-C 6/HALS-C 5/AO-C 1/ULA-C 1 | 37.5/12.5/40/10 | 2.1 | 6.7 | 33 | 0.94 |
| 2 | HALS-C 4/HALS-C 5/AO-C 1/ULA-C 1 | 50/15/25/10 | 2.3 | 6.6 | 34 | 1.06 |
| 3 | HALS-C 3/HALS-C 5/AO-C 1/ULA-C 1 | 50/15/25/10 | 2.8 | 6.8 | 33 | 1.22 |
| 4 | HALS-C 2/HALS-C 5/AO-C 1/ULA-C 1 | 50/15/25/10 | 2.6 | 7.1 | 33 | 0.97 |
| 5 | HALS-C 3/HALS-C 4/AO-C 1/ULA-C 1 | 50/15/25/10 | 2.4 | 7.2 | 34 | 0.89 |
| 6 | HALS-C 2/HALS-C 4/AO-C 1/ULA-C 1 | 50/15/25/10 | 2.2 | 6.8 | 31 | 0.79 |
| 7 | HALS-C 4/AO-C 1/ULA-C 1 | 65/25/10 | 2.9 | 6.6 | 29 | 0.94 |

*Data obtained using a 56/44 weight ratio of P-C 3/P-C 1. Fatigue measured after 100 hours under Xenon bulb. All data collected in duplicate, except test run 1.

TABLE 6*

| Test Run No. | Additive | Weight Ratio | I b* | F b* | % Fatigue Photopic | [% Fat @ 570 nm ÷ % Fat @ 470 nm] |
|---|---|---|---|---|---|---|
| 1 | HALS-C 6/HALS-C 5/AO-C 1/ULA-C 1 | 37.5/12.5/40/10 | 2.0 | 6.9 | 32 | 1.14 |
| 2 | HALS-C 4/HALS-C 5/AO-C 1/ULA-C 1 | 50/15/25/10 | 2.0 | 6.8 | 31 | 1.14 |
| 3 | HALS-C 3/HALS-C 5/AO-C 1/ULA-C 1 | 50/15/25/10 | 2.2 | 6.8 | 34 | 1.30 |
| 4 | HALS-C 2/HALS-C 5/AO-C 1/ULA-C 1 | 50/15/25/10 | 1.9 | 7.0 | 32 | 1.03 |
| 5 | HALS-C 3/HALS-C 4/AO-C 1/ULA-C 1 | 50/15/25/10 | 1.8 | 6.9 | 35 | 1.29 |

TABLE 6*-continued

| Test Run No. | Additive | Weight Ratio | I b* | F b* | % Fatigue Photopic | [% Fat @ 570 nm ÷ % Fat @ 470 nm] |
|---|---|---|---|---|---|---|
| 6 | HALS-C 2/HALS-C 4/AO-C 1/ULA-C 1 | 50/15/25/10 | 2.0 | 6.5 | 28 | 0.96 |
| 7 | HALS-C 4/AO-C 1/ULA-C 1 | 65/25/10 | 2.9 | 8.2 | 39 | 1.52 |

*Data obtained using a 35/65 weight ratio of P-C 3/P-C 1. Fatigue measured after 100 hours under Xenon bulb.

The present invention has been described with reference to specific details of particular embodiments thereof. It is not intended that such details be regarded as limitations upon the scope of the invention except insofar as to the extent that they are included in the accompanying claims.

We claim:

1. A composition comprising, in combination, a carrier, a photochromic amount of organic photochromic naphthopyran material, and an amount of a stabilizer system comprising, in combination, (a) 5 to 50 weight percent of at least one polyphenolic antioxidant, (b) 5 to 50 weight percent of organic ultraviolet light absorber, and (c) 10 to 90 weight percent of at least one hindered amine light stabilizer, said stabilizer system being sufficient to provide a reduction of at least 30% in the % Photopic Fatigue of said naphthopyran material, the weight ratio of the photochromic naphthopyran material to the stabilizer system being from 2.5:1 to 1.5:1.

2. The composition of claim 1 wherein said stabilizer system comprises:

(a) 10 to 40 weight percent of polyphenolic antioxidant, said antioxidant being selected from the group consisting of tetrakis[methylene(3,5-di-tert-butyl-4-hydroxyhydrocinnamate)]methane; 1,3,5-trimethyl-2,4,6-tris(3,5-di-tert-butyl-4'-hydroxybenzyl)benzene; 1,3,5-tris(3,5-di-tert-butyl-4'-hydroxybenzyl) isocyanurate; 3,5-di-tert-butyl-4-hydroxyhydrocinnamic triester with 1,3,5-tris(2-hydroxyethyl)s-triazine-2,4,6-(1H,3H,5H)-trione; 1,3,5-tris(4-tert-butyl-3-hydroxy-2,6-dimethylbenzyl)s-triazine-2,4,6-(1H,3H,5H)-trione and mixtures thereof;

(b) 10 to 40 weight percent of organic ultraviolet light absorber, said ultraviolet light absorber being selected from the group consisting of 2-hydroxybenzophenones, 2-hydroxyphenylbenzotriazoles, oxalanilides, 2-hydroxyphenyltriazines, cinnamates, salicylates, formamidines and mixtures thereof; and (c) 20 to 80 weight percent hindered amine light stabilizer, said hindered amine light stabilizer being selected from the group consisting of bis(1,2,2,6,6-pentamethyl-4-piperdinyl)[3,5-bis(1,1-dimethylethyl-4-hydroxyphenyl)methyl]butyl propanedioate; bis(2,2,6,6-tetramethyl-4-piperdinyl)decanedioate; 1-acetyl-4-(3-dodecyl-2,5-dioxo-1-pyrrolidinyl)-2,2,6,6-tetramethyl-piperidine and N-unsubstituted HALS compounds, N-methylated HALS compounds and mixtures thereof, the weight ratio of the photochromic naphthopyran material to the stabilizer system being from 2:1 to 1.6:1.

3. The composition of claim 2 wherein said stabilizer system comprises:

(a) 10 to 30 weight percent of 1,3,5-tris(3,5-di-tert-butyl-4'-hydroxybenzyl) isocyanurate;

(b) 10 to 30 weight percent of 2,4-bis(2,4-dimethylphenyl)-6-(2-hydroxy-4-iso-octylphenyl)-1,3,5-triazine; and (c) 20 to 70 weight percent of 1-acetyl-4-(3-dodecyl-2,5-dioxo-1-pyrrolidinyl)-2,2,6,6-tetramethylpiperidine, N-unsubstituted HALS compounds or mixtures thereof.

4. The composition of claim 1 wherein said carrier is an organic solvent or organic polymeric host material.

5. The composition of claim 4 wherein said organic solvent is selected from the group consisting of benzene, toluene, methyl ethyl ketone, acetone, ethanol, tetrahydrofurfuryl alcohol, N-methyl pyrrolidinone, 2-methoxyethyl ether, xylene, cyclohexane, 3-methyl cyclohexanone, ethyl acetate, tetrahydrofuran, methanol, methyl propionate, ethylene glycol and mixtures thereof.

6. The composition of claim 4 wherein said organic polymeric host material is selected from the group consisting of poly[($C_1$–$C_{12}$) alkyl methacrylates], poly(oxyalkylene dimethacrylates), poly(alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), thermoplastic polycarbonates, polyesters, polyurethanes, poly(ethylene terephthalate), polystyrene, poly(alpha methylstyrene), copoly(styrene-methylmethacrylate), copoly(styrene-acrylonitrile), polyvinylbutyral and polymers of members of the group consisting of bis(allyl carbonate) monomers, polyfunctional acrylate monomers, polyfunctional methacrylate monomers, diethylene glycol dimethacrylate monomers, diisopropenyl benzene monomers, ethoxylated bisphenol A dimethacrylate monomers, ethylene glycol bismethacrylate monomers, poly(ethylene glycol) bismethacrylate monomers, ethoxylated phenol bis methacrylate monomers, alkoxylated polyhydric alcohol polyacrylate monomers, styrene monomers, urethane acrylate monomers, glycidyl acrylate monomers, glycidyl methacrylate monomers, and diallylidene pentaerythritol monomers.

7. The composition of claim 6 wherein the polymeric organic host material is a solid transparent polymer selected from the group consisting of poly(methyl methacrylate), poly(ethylene glycol bismethacrylate), poly(ethoxylated bisphenol A dimethacrylate), thermoplastic polycarbonate, poly(vinyl acetate), polyvinylbutyral, polyurethane and polymers of members of the group consisting of diethylene glycol bis(allyl carbonate) monomers, diethylene glycol dimethacrylate monomers, ethoxylated phenol bis methacrylate monomers, diisopropenyl benzene monomers and ethoxylated trimethylol propane triacrylate monomers.

8. The composition of claim 7 wherein said stabilizer system comprises:

(a) 10 to 30 weight percent of 1,3,5-tris(3,5-di-tert-butyl-4'-hydroxybenzyl) isocyanurate;

(b) 10 to 30 weight percent of 2,4-bis(2,4-dimethylphenyl)-6-(2-hydroxy-4-iso-octylphenyl)-1,3,5-triazine; and (c) 20 to 70 weight percent of 1-acetyl-4-(3-dodecyl-2,5-dioxo-1-pyrrolidinyl)-2,2,6,6-tetramethylpiperidine, N-unsubstituted HALS compounds or mixtures thereof.

9. The composition of claim 8 wherein said solid transparent polymer is in the form of a lens.

10. The composition of claim 1 wherein said organic photochromic naphthopyran material comprises a combination of photochromic naphthopyrans that exhibits an activated substantially neutral gray or brown color when incorporated into a carrier and exposed to solar ultraviolet radiation.

11. The composition of claim 10 wherein said photochromic naphthopyran material is a combination comprising (i) at least one organic photochromic naphthopyran material having a visible lambda max of from 400 nanometers to 525 nanometers, and (ii) at least one organic photochromic naphthopyran material having a visible lambda max of from greater than 525 nanometers to 650 nanometers.

12. The composition of claim 11 wherein (a) said photochromic naphthopyran material (i) is selected from the group consisting of:
  (1) 2,2-diphenyl-5-hydroxymethyl-6-methyl-9-methoxy-2H-naphtho[1,2-b]pyran;
  (2) 2,2-diphenyl-5-hydroxymethyl-6-phenyl-2H-naphtho[1,2-b]pyran;
  (3) 2,2-diphenyl-5-(2-ethoxy-2-oxo-ethoxycarbonyl)-8-methyl-2H-naphtho[1,2-b]pyran;
  (4) 2,2-diphenyl-5-methoxycarbonyl-8-methyl-2H-naphtho[1,2-b]pyran;
  (5) 3-(2-fluorophenyl)-3-(4-methoxyphenyl)-8-methoxy-9-methoxycarbonyl-3H-naphtho[2,1-b]pyran;
  (6) 2,2-diphenyl-4-methoxycarbonyl-5-(2-methylpropionyloxy)-2H-naphtho[1,2b]pyran; and
  (7) mixtures of said naphthopyrans;

(b) said photochromic naphthopyran material (ii) is selected from the group consisting of:
  (1) 3-(4-methoxyphenyl)-3-(3-methyl-4-methoxyphenyl)-13-hydroxy-indeno[2,1-f]naphtho[1,2-b]pyran;
  (2) 3,3-di(4-methoxyphenyl)-13-hydroxy-13-methyl-indeno[2,1-f]naphtho[1,2-b]pyran;
  (3) 3,3-di(4-methoxyphenyl)-6,11-dimethyl-13-(1-methylethyl)-13-hydroxy-indeno[2,1-f]naphtho[1,2-b]pyran;
  (4) 3-(4-methoxyphenyl)-3-(3,4-dimethoxyphenyl)-6,11-dimethyl-13,13-dipropyl-indeno[2,1-f]naphtho[1,2-b]pyran; and
  (5) mixtures of said naphthopyrans.

13. The composition of claim 12 wherein said stabilizer system comprises:

(a) 10 to 30 weight percent of 1,3,5-tris(3,5-di-tert-butyl-4'-hydroxybenzyl) isocyanurate;

(b) 10 to 30 weight percent of 2,4-bis(2,4-dimethylphenyl)-6-(2-hydroxy-4-iso-octylphenyl)-1,3,5-triazine; and (c) 20 to 70 weight percent of 1-acetyl-4-(3-dodecyl-2,5-dioxo-1-pyrrolidinyl)-2,2,6,6-tetramethylpiperidine, N-unsubstituted HALS compounds or mixtures thereof.

14. The composition of claim 13 wherein said carrier is a lens.

15. A method for improving the light fatigue resistance of a photochromic composition comprising an organic photochromic naphthopyran material and a carrier comprising incorporating into said photochromic composition an amount of a stabilizer system comprising, in combination, (a) 5 to 50 weight percent of at least one polyphenolic antioxidant, (b) 5 to 50 weight percent of organic ultraviolet light absorber, and (c) 10 to 90 weight percent of at least one hindered amine light stabilizer, said stabilizer system being sufficient to provide a reduction of at least 30% in the % Photopic Fatigue of said naphthopyran material, the weight ratio of the photochromic naphthopyran material to the stabilizer system being from 2.5:1 to 1.5:1.

16. The method of claim 15 wherein said stabilizer system comprises:

(a) 10 to 40 weight percent of polyphenolic antioxidant, said antioxidant being selected from the group consisting of tetrakis[methylene(3,5-di-tert-butyl-4-hydroxyhydrocinnamate)]methane; 1,3,5-trimethyl-2,4,6-tris(3,5-di-tert-butyl-4'-hydroxybenzyl)benzene; 1,3,5-tris(3,5-di-tert-butyl-4'-hydroxybenzyl) isocyanurate; 3,5-di-tert-butyl-4-hydroxyhydrocinnamic triester with 1,3,5-tris(2-hydroxyethyl)s-triazine-2,4,6-(1H,3H,5H)-trione; 1,3,5-tris(4-tert-butyl-3-hydroxy-2,6-dimethylbenzyl)s-triazine-2,4,6-(1H,3H,5H)-trione and mixtures thereof;

(b) 10 to 40 weight percent of organic ultraviolet light absorber, said ultraviolet light absorber being selected from the group consisting of 2-hydroxybenzophenones, 2-hydroxyphenylbenzotriazoles, oxalanilides, 2-hydroxyphenyltriazines, cinnamates, salicylates, formamidines and mixtures thereof; and (c) 20 to 80 weight percent hindered amine light stabilizer, said hindered amine light stabilizer being selected from the group consisting of bis(1,2,2,6,6-pentamethyl-4-piperdinyl)[3,5-bis(1,1-dimethylethyl-4-hydroxyphenyl)methyl]butyl propanedioate; bis(2,2,6,6-tetramethyl- 4-piperdinyl)decanedioate; 1-acetyl-4-(3-dodecyl-2,5-dioxo-1-pyrrolidinyl)-2,2,6,6-tetramethyl-piperidine and N-unsubstituted HALS compounds, N-methylated HALS compounds and mixtures thereof, the weight ratio of the photochromic naphthopyran material to the stabilizer system being from 2:1 to 1.6:1.

17. The method of claim 16 wherein said stabilizer system comprises:

(a) 10 to 30 weight percent of 1,3,5-tris(3,5-di-tert-butyl-4'-hydroxybenzyl) isocyanurate;

(b) 10 to 30 weight percent of 2,4-bis(2,4-dimethylphenyl)-6-(2-hydroxy-4-iso-octylphenyl)-1,3,5-triazine; and (c) 20 to 70 weight percent of 1-acetyl-4-(3-dodecyl-2,5-dioxo-1-pyrrolidinyl)-2,2,6,6-tetramethylpiperidine, N-unsubstituted HALS compounds or mixtures thereof.

18. The method of claim 16 wherein said carrier is an organic solvent or organic polymeric host.

19. The method of claim 18 wherein said organic solvent is selected from the group consisting of benzene, toluene, methyl ethyl ketone, acetone, ethanol, tetrahydrofurfuryl alcohol, N-methyl pyrrolidinone, 2-methoxyethyl ether, xylene, cyclohexane, 3-methyl cyclohexanone, ethyl acetate, tetrahydrofuran, methanol, methyl propionate, ethylene glycol and mixtures thereof.

20. The method of claim 18 wherein said organic polymeric host is a solid transparent polymer selected from the group consisting of poly(methyl methacrylate), poly(ethylene glycol bismethacrylate), poly(ethoxylated bisphenol A dimethacrylate), thermoplastic polycarbonate, poly(vinyl acetate), polyvinylbutyral, polyurethane and polymers of members of the group consisting of diethylene glycol bis(allyl carbonate) monomers, diethylene glycol dimethacrylate monomers, ethoxylated phenol bis methacrylate monomers, diisopropenyl benzene monomers and ethoxylated trimethylol propane triacrylate monomers.

21. The method of claim 20 wherein said organic naphthopyran material comprises a combination of photochromic naphthopyrans that exhibits an activated substantially neutral gray or brown color when incorporated into a carrier and exposed to solar ultraviolet radiation.

22. The method of claim 21 wherein said photochromic material is a combination comprising:

(i) at least one organic photochromic naphthopyran material having a visible lambda max of from 400 nanometers to 525 nanometers, and (ii) at least one organic photochromic naphthopyran material having a visible lambda max of from greater than 525 nanometers to 650 nanometers.

23. The method of claim 22 wherein said solid transparent polymer is in the form of a lens.

* * * * *